(No Model.)

H. LILLEY.
METHOD OF MAKING PIPE HOOKS.

No. 390,491. Patented Oct. 2, 1888.

A

WITNESSES.
Jos. S. Beaumont
J. H. Beaumont

INVENTOR.
Henry Lilley.
by John Shinn.
Attorney.

United States Patent Office.

HENRY LILLEY, OF PHILADELPHIA, PENNSYLVANIA, ASSIGNOR OF ONE-HALF TO JOHN T. HILLSLEY, OF SAME PLACE.

METHOD OF MAKING PIPE-HOOKS.

SPECIFICATION forming part of Letters Patent No. 390,491, dated October 2, 1888.

Application filed June 25, 1888. Serial No. 278,077. (No model.)

*To all whom it may concern:*

Be it known that I, HENRY LILLEY, a citizen of the United States, residing at Philadelphia, in the county of Philadelphia and State of Pennsylvania, have invented certain new and useful Improvements in the Process of Manufacturing Pipe-Hooks; and I do hereby declare that the following is a full, clear, and exact description of the invention, which will enable others skilled in the art to which it appertains to make and use the same.

My improvement relates to a process of manufacturing pipe-hooks by cutting them from a flat plate of iron or other metal.

The invention consists in cutting away a portion of the plate to form the "heel" of the succeeding hook-blank, which is done at the same time that a blank is cut from the plate for each hook-blank, as will be hereinafter described, referring to the accompanying drawings, making a part of this specification, in which—

Figure 1:
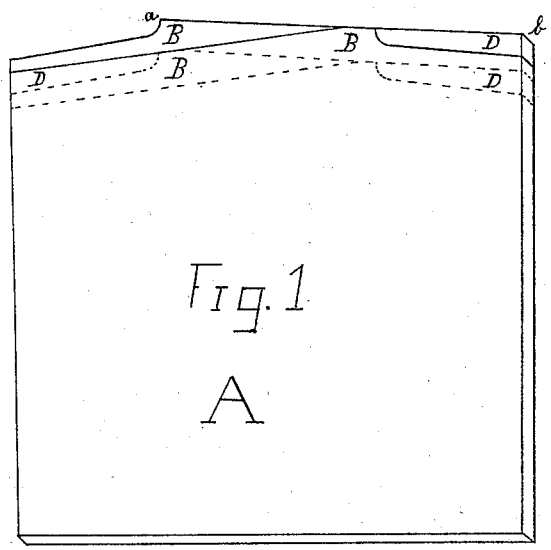
Figure 2:
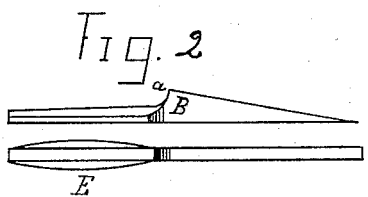
Figure 3:
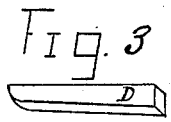
Figure 4:
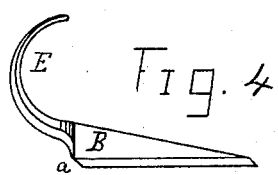

Figure 1 represents a metal plate, showing the manner of cutting the hook-blanks from a flat metal plate. Fig. 2 shows side and edge views of a hook-blank. Fig. 3 shows a view of the scrap cut from the plate to form the heel of the next hook-blank to be cut from the plate. Fig. 4 shows a side view of a finished pipe-hook.

Similar letters refer to similar parts throughout the several views.

To carry my invention into practice, I require and use a cutting-machine, such as is well-known and used for cutting nails. In this machine I arrange a chisel-knife of a shape to correspond to the top line of Fig. 1.

A, Fig. 1, represents a metal plate; B, the hook-blank; D, the scrap.

The operation is as follows: The plate A is heated to a red heat and held by a pair of clamping-tongs. The first chop cuts the end of the plate to shape (shown at top of Fig. 1)—that is, the scrap D is cut out, forming the heel $a$ and a straight cut from $a$ to $b$. The plate A is then turned over from right to left, and the next chop will cut the blank B and scrap D from the plate A. The blank B drops into a die, which die compresses the hook end to a shape as shown at E, Fig. 2. It is then relieved from the die and drops into a receptacle. The blanks B are separated from the scraps D and taken to a machine, by which the hook end E is turned to shape, as shown in Fig. 4.

The finished hooks may be galvanized or dipped in paint, if desired, or they may be cut from a copper or composition metal plate. If desired, the hooks may be made without flattening at E, and the hook end may be turned by hand over a former.

Having as above fully described my invention and the best manner known to me for using the same, what I claim as my invention, and desire to secure by Letters Patent, is—

The method of making a pipe-hook by first cutting from a flat metal plate a portion, D, to form the heel $a$, turning the plate, and cutting the blank B, which is afterward bent at E to form a pipe-hook, as shown and described.

HENRY LILLEY.

Witnesses:
JOHN SHINN,
THEO. M. HILLSLEY.